United States Patent [19]

Carr et al.

[11] 4,160,760
[45] Jul. 10, 1979

[54] PROCESS FOR PREPARING POLYACRYLONITRILE DOPED WITH PRUSSION BLUE

[75] Inventors: Stephen H. Carr; Samuel I. Stupp, both of Evanston, Ill.

[73] Assignee: Northwestern University, Evanston, Ill.

[21] Appl. No.: 826,419

[22] Filed: Aug. 22, 1977

[51] Int. Cl.$^2$ .................. C08K 3/02; C08K 5/16; D06P 1/00; D06P 3/70
[52] U.S. Cl. ........................... 260/42.21; 8/52; 8/177 R; 260/DIG. 23
[58] Field of Search ............... 260/42.21, DIG. 23; 8/52, 177 R

[56] References Cited

U.S. PATENT DOCUMENTS

| | | | |
|---|---|---|---|
| 441 | 10/1837 | Stephens | 8/52 |
| 3,215,663 | 11/1965 | Weisberg | 260/42.21 |
| 3,232,904 | 2/1966 | Seibert et al. | 260/42.21 |
| 3,336,150 | 8/1967 | Takahashi et al. | 260/42.21 |
| 3,663,161 | 5/1972 | Litzler et al. | 8/177 R |
| 3,927,964 | 12/1975 | Botros | 260/42.21 |
| 3,935,138 | 1/1976 | Wingler et al. | 260/42.21 |
| 4,020,037 | 4/1977 | Hahnke et al. | 260/42.21 |

FOREIGN PATENT DOCUMENTS 267575  10/1968  U.S.S.R. ................ 260/42.21

*Primary Examiner*—Ronald W. Griffin
*Attorney, Agent, or Firm*—Kegan, Kegan & Berkman

[57] ABSTRACT

A method for interacting Prussian blue with polyacrylonitrile in the presence of dimethylformamide to produce a polymer solid exhibiting a high degree of color fastness, levelness, and stability and having enhanced and highly useful electrical properties.

6 Claims, No Drawings

PROCESS FOR PREPARING POLYACRYLONITRILE DOPED WITH PRUSSION BLUE

The Government has rights in this invention pursuant to Contract No. N-0014-75-C-0963, awarded by the Office of Naval Research.

BACKGROUND OF THE INVENTION

Many procedures are known in the prior art for physically incorporating dying agents and other materials into polymer solids. Such methods and processes have for the most part failed to provide completely satisfactory solutions to the various technical problems involved, particularly in the incorporation of such chemicals as Prussian blue and other metallic complexes into polymeric systems. The present invention provides a simple yet highly effective chemical procedure whereby chemicals such as Prussian blue, or Prussian blue analogues, and constituting hydrated complexes of metal and cyanide ions, may be incorporated into and made reactive with a polymeric material such as polyacrylonitrile to produce a homogeneous, colored product exhibiting enhanced electrical properties correlated with the presence of the metal complex. One significant novel feature of the procedure of the invention is that it makes it possible to disperse or dissolve, at a much more uniform level, many substances which, heretofore, could not be so dispersed in a polymer solid. An important property of the resulting product is that the dispersion remains unchanged with time and is preserved even during subsequent dissolution of the polymer matrix.

DESCRIPTION OF PREFERRED EMBODIMENT

The aims and objects of the invention are achieved by a method which makes it possible to produce polymer solids containing Prussian blue or Prussian blue analogues distributed within a polymer matrix in an essentially molecularly dispersed state. It is an important feature of the invention that the method is both practical and economical, and provides a novel technique for incorporating the unique coloring agents as additives in the systems involved. The invention provides polymer solids exhibiting a remarkably high degree of color fastness, levelness, and stability. Additionally, the products of the invention are polymer solids having extremely useful electrical properties.

In accordance with the practice of the invention, the following detailed procedure constitutes a preferred technique for accomplishing the aims and objects of the invention.

A 2% solution of polyacrylonitrile in dimethyl formamide was prepared. A second solution, constituting a 0.02 Molar colloidal dispersion of Prussian blue in water was then formulated. The dispersion was then slowly introduced, preferably drop-wise with vigorous agitation, into the dimethyl formamide solution of the polyacrylonitrile. In a preferred formulation, one milliliter of Prussian blue dispersion was blended with 90 milliliters of polyacrylonitrile solution.

The resulting liquid system was then evaporated under reduced pressure, preferably in a system below 1 inch mercury pressure, and an elevated temperature, in the range of about 90° C., to remove the volatile constitutents, including the dimethyl formamide and water. The resulting product constituted a substantially homogeneous solid, blue in color, and the preferred product of the invention. This solid product was found to be readily formable into films or filaments, using conventional techniques. Additionally, it was found that the product was readily used to apply an adherant coating to other objects, using any of the techniques which are well-known in the relevant industries for producing such specialized products for particular uses.

It has been found that the products produced in accordance with the method of the invention exhibit advantages not heretofore achievable. One is that the Prussian blue acts effectively as a dye to color the solid material permanently. Additionally, the Prussian blue functions actively as a dye site for subsequent or concomitant incorporation of other dyestuffs and coloring agents. An additional advantageous feature of the products of the invention is that the polyacrylonitrile films produced in accordance with the method described have enhanced electrical properties, including those of charge storage, piezoelectricity, pyroelectricity and conductivity. The superior characteristics, in the area of electrical properties, are believed to be due to the homogeneity these systems possess at or near the molecular level. Workers skilled in the art of electrical devices will recognize the various potentials of the products for use as coatings or films in which the presence of the described electrical properties is important.

The novel products of the invention have been found to be color stable at temperatures up to 140° C. or even higher. Moreover, redissolution of the formed objects in pure dimethyl formamide, even after one year of aging, has been found to yield a homogeneous fluid free of any detectable precipitate particles.

It will be readily appreciated by those skilled in the art that the process of this invention provides a means for incorporating Prussian blue or Prussian blue analogues into polymer solids at a molecularly dispersed level. Prussian blues are ordinarily not soluble in water, but such chemical complexes can be dispersed at or below the colloidal level in water. Prussian blues are neither soluble in nor readily dispersible in dimethyl formamide, which is a solvent for the polymer. Nevertheless, it is possible, in accordance with the present invention, to use dimethyl formamide in which polyacrylonitrile has been previously dissolved as a kind of "solvent" for a Prussian blue additive. The process requires that a Prussian blue first be in a highly dispersed state, such as can be achieved in water, and that the polymer itself be in a dissolved state, such as in the solvent, dimethyl formamide. Tests carried out establish that it is not necessary that the additive, for example Prussian blue, be present in the polymer at any concentration determined by or relating to a stoichometric relationship. Mechanically formed articles or objects such as fibers and films, which contain Prussian blues at or near the molecularly dispersed level, can be made directly from this composition.

While the invention has been described in detail with respect to a preferred embodiment, the method may also be carried out effectively using solids from related polymers and additives. For example, in addition to dimethyl formamide as the solvent, it is possible to use dimethyl sulfoxide, and other nonaqueous solvents. Moreover, acrylonitrile-containing polymers may be substituted for the polyacrylonitrile, provided, however, that the polymer is substantially soluble in either of these solvents, as will be appreciated by those skilled in the art. Similarly, the method of the invention will function effectively with polymer blends in which at least one of the polymeric constitutents is an acrylonitrile homopolymer or copolymer which meets the solubility criterion described above. Optionally, different additives, for example, iodine, may be incorporated, either in combination with a Prussian blue or alone, into the acyrlonitrile containing polymers, in accordance with the method of the invention, or in accordance with obvious, non-inventive variations thereof.

While, for purposes of disclosure, specific preferred methods for carrying out the invention, and specific preferred components for the resulting products have been described, many changes, modifications and variations may be made without departing from the spirit of the invention, and all such changes, modifications and variations are included within the appended claims.

What is claimed is:

1. A method for reacting color agents selected from the group consisting of hydrated metal cyanide complexes, and iodine with polyacrylonitrile homopolymers and copolymers to provide a polymer solid exhibiting enhanced electrical properties and color characteristics, said method comprising the steps of:
   a. preparing a polymer solution of acrylonitrile polymer in a solvent selected from the group consisting of dimethyl formamide and dimethyl sulfoxide at a concentration below 20 weight-percent polymer,
   b. preparing an aqueous dispersion of an additive selected from the group consisting of hydrated metal cyanide complexes, iodine and mixtures thereof at a concentration below 0.1 Molar,
   c. agitating said polymer solution while slowly adding thereto said aqueous dispersion to provide a substantially homogeneous fluid system,
   d. evaporating said fluid system to remove said solvent and water therefrom, to provide a homogeneous, colored solid comprising an acrylonitrile polymer containing the additive distributed therethrough as an essentially molecularly dispersed phase.

2. The method as set forth in claim 1 wherein said solution of acrylonitrile polymer is in dimethyl formamide and contains polyacrylonitrile at a concentration in the range of up to 3 percent by weight.

3. The method as set forth in claim 1 wherein said additive is an aqueous dispersion of Prussian blue containing Prussian blue in a concentration of about 0.02 Molar.

4. The method as set forth in claim 1 wherein said evaporating of said fluid system is conducted under pressures at or below normal atmospheric pressure and at temperatures near or above room temperature.

5. The method as set forth in claim 1 and further comprising the step of forming said solid into a film characterized by enhanced electrical properties.

6. The method as set forth in claim 1 and further comprising the step of forming said solid into a fiber exhibiting enhanced electrical conductivity and dying characteristics.

* * * * *